US008024307B2

(12) United States Patent
Imai et al.

(10) Patent No.: US 8,024,307 B2
(45) Date of Patent: Sep. 20, 2011

(54) INFORMATION PROCESSING APPARATUS AND INFORMATION PROCESSING METHOD

(75) Inventors: Satoshi Imai, Tokyo (JP); Ken Kuroda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 361 days.

(21) Appl. No.: 11/946,006

(22) Filed: Nov. 27, 2007

(65) Prior Publication Data

US 2008/0147662 A1 Jun. 19, 2008

(30) Foreign Application Priority Data

Dec. 13, 2006 (JP) ................................ 2006-336372

(51) Int. Cl.
*G06F 7/00* (2006.01)
(52) U.S. Cl. ...................... 707/698; 707/705; 707/784
(58) Field of Classification Search .............. 707/1, 698, 707/705, 784, 999.001
See application file for complete search history.

(56) References Cited

U.S. PATENT DOCUMENTS

| 5,694,569 | A * | 12/1997 | Fischer ...................... 711/216 |
| 5,778,395 | A * | 7/1998 | Whiting et al. ................... 1/1 |
| 5,919,247 | A * | 7/1999 | Van Hoff et al. ............. 709/217 |
| 6,098,079 | A * | 8/2000 | Howard ....................... 707/205 |
| 6,430,608 | B1 * | 8/2002 | Shaio .......................... 709/217 |
| 6,594,665 | B1 * | 7/2003 | Sowa et al. ..................... 1/1 |
| 6,625,591 | B1 * | 9/2003 | Vahalia et al. ................... 1/1 |
| 6,704,730 | B2 * | 3/2004 | Moulton et al. ................. 707/6 |
| 7,512,635 | B1 * | 3/2009 | Solin .......................... 1/1 |
| 7,809,686 | B2 * | 10/2010 | McCreight et al. ........... 707/653 |
| 2001/0018739 | A1 * | 8/2001 | Anderson et al. ............. 713/176 |
| 2003/0046260 | A1 * | 3/2003 | Satyanarayanan et al. ....... 707/1 |
| 2003/0120953 | A1 * | 6/2003 | Radatti ........................ 713/201 |
| 2004/0111608 | A1 * | 6/2004 | Oom Temudo de Castro et al. ......................... 713/156 |
| 2004/0221234 | A1 | 11/2004 | Imai ............................ 715/531 |
| 2005/0050090 | A1 * | 3/2005 | Kawahata et al. ........ 707/103 Y |
| 2005/0108240 | A1 * | 5/2005 | Bolosky et al. ................. 707/9 |
| 2005/0114658 | A1 * | 5/2005 | Dye et al. ..................... 713/165 |
| 2005/0144190 | A1 * | 6/2005 | Wada ........................... 707/102 |
| 2005/0197996 | A1 * | 9/2005 | Cobb et al. ..................... 707/1 |
| 2005/0251682 | A1 * | 11/2005 | Collins et al. ................. 713/176 |
| 2005/0256871 | A1 * | 11/2005 | Semerdzhiev .................. 707/9 |
| 2006/0123010 | A1 * | 6/2006 | Landry et al. ................. 707/10 |
| 2006/0130037 | A1 * | 6/2006 | Mackay ....................... 717/168 |
| 2006/0195486 | A1 * | 8/2006 | Ohno et al. .................. 707/200 |
| 2006/0200675 | A1 * | 9/2006 | Maeng et al. ................ 713/176 |
| 2007/0198637 | A1 * | 8/2007 | Deboy et al. ................. 709/204 |
| 2007/0244920 | A1 * | 10/2007 | Palliyil et al. ................. 707/102 |
| 2008/0005120 | A1 * | 1/2008 | Li ................................ 707/10 |
| 2008/0005195 | A1 * | 1/2008 | Li ............................... 707/203 |
| 2008/0095336 | A1 * | 4/2008 | Tysowski et al. ........... 379/88.22 |
| 2008/0133922 | A1 * | 6/2008 | Williams ...................... 713/176 |
| 2008/0134341 | A1 * | 6/2008 | Sakamura et al. ............. 726/27 |

(Continued)

*Primary Examiner* — Hung T Vy
*Assistant Examiner* — Lina Cao
(74) *Attorney, Agent, or Firm* — Fitzpatrick, Cella, Harper & Scinto

(57) ABSTRACT

This invention has as its object to easily verify alterations etc. of files stored in a folder. To achieve this object, an information processing method of this invention is a method of applying hash processing to files stored in a folder, which includes a designation step of designating a folder; a first generation step (steps S601 and S602) of generating hash data for each of files included in the folder designated in the designation step; a second generation step (steps S603 to S609) of generating one multiplexed hash data by repeating multiplexing each of the hash data generated in the first generation step in turn according to a predetermined order; and a step (step S610) of storing the multiplexed hash data in association with the folder designated in the designation step.

5 Claims, 10 Drawing Sheets

U.S. PATENT DOCUMENTS

2008/0148137 A1* 6/2008 Terao et al. .................. 715/200
2008/0177775 A1* 7/2008 Kawate et al. ................ 707/102
2008/0263102 A1* 10/2008 Mochizuki .................... 707/200
2008/0263354 A1* 10/2008 Beuque et al. ................ 713/158

* cited by examiner

FIG. 7

| | | 701 | 702 | 703 | 704 |

| FOLDER | MULTIPLEXED HASH DATA | FILE | HASH |
|---|---|---|---|
| FOLDER 401 | HASH DATA 510 | FILE405 | HASH DATA 501 |
| | | FILE404 | HASH DATA 502 |
| | | FILE407 | HASH DATA 505 |
| | | FILE406 | HASH DATA 506 |

700

INFORMATION PROCESSING APPARATUS AND INFORMATION PROCESSING METHOD

BACKGROUND OF THE INVENTION

1. Field of the Invention

The present invention relates to an information processing technique for processing files stored in folders.

2. Description of the Related Art

Conventionally, upon managing files whose dates are of importance (e.g., those based on ministry ordinances) in a file management system, folder names are normally assigned based on their dates like "2005-10" for a folder that stores files processed in October 2005, "2005-11" for a folder that stores files processed in November 2005, and so forth.

By configuring folders based on the dates in this way, the user can recognize at a glance when files were created and saved, and the need for searching files can be obviated. Files whose storage limitations have been reached must be discarded. In this case as well, using the folder configuration based on the dates, files can be deleted together for respective folders.

Meanwhile, upon enforcement of e-Document Law in Spring 2005 in Japan, respective ministries and agencies issued related ministry ordinances. Some ministry ordinances require "verification" means for detecting alterations and the like of files (to be referred to as alternations, etc. hereinafter). For example, new ministry and agency ordinances and the like issued by National Tax Agency, Financial Services Agency, Ministry of Internal Affairs and Communications, and Health, Labour and Welfare Ministry correspond to them.

In order to detect alterations etc. of files, the file management system must apply, in advance, processing required to detect alterations etc. (for example, processing for appending signatures or time stamps to files and generating their hash data, and so forth).

However, it is a heavy workload on the user to read out stored files in large quantities one by one and to apply such processing.

Also, it is inconvenient for the user to read out files that have undergone such processing one by one, and to periodically verify the presence/absence of alterations etc.

For these reasons, development of a file management system which can simultaneously apply the processing to a plurality of files and can verify them is demanded. Especially, since files based on ministry ordinances are normally managed for respective folders, it is desirable to apply the processing for respective folders.

SUMMARY OF THE INVENTION

The present invention has been made in consideration of the aforementioned problems, and has as its object to easily verify alterations etc. of files stored in folders of a file management system.

In order to achieve the above object, an information processing apparatus according to the present invention comprises the following arrangement. That is, an information processing apparatus comprising:

a designation unit configured to designate a folder from a plurality of folders;

a first generation unit configured to generate hash data for each of files included in the folder designated by the designation unit;

a second generation unit configured to generate one multiplexed hash data by repeating multiplexing each of the hash data generated by the first generation unit in turn from a plurality of folders; and a storage unit configured to store the multiplexed hash data in association with the folder designated by the designation unit.

According to the present invention, alterations etc. of files stored in folders of a file management system can be easily verified.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 shows an example of a document list 700 generated in step S609;

DESCRIPTION OF THE EMBODIMENTS

Preferred embodiments of the present invention will now be described in detail in accordance with the accompanying drawings.

First Embodiment

1. Arrangement of File Management System

Figure 1:
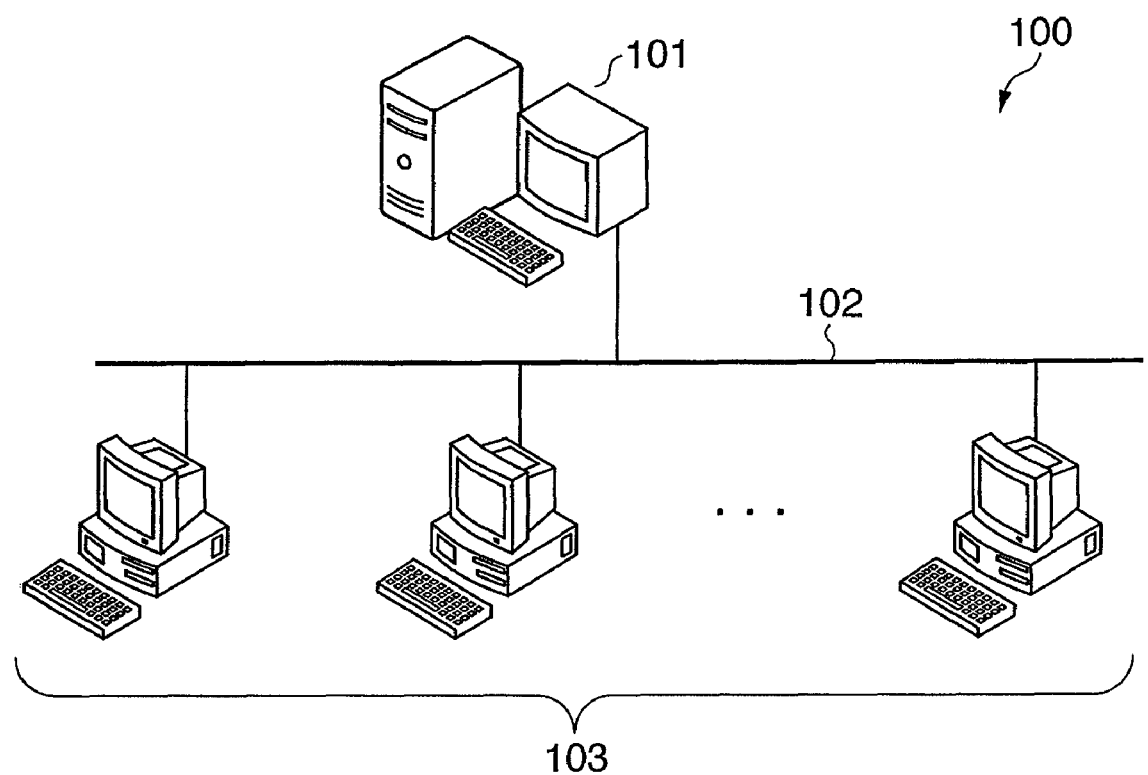
FIG. 1 is a diagram showing the arrangement of a file management system 100 which comprises a server apparatus (information processing apparatus) according to the first embodiment of the present invention.

FIG. 1 is a diagram showing the arrangement of a file management system 100 which comprises a server apparatus (information processing apparatus) according to the first embodiment of the present invention.

As shown in FIG. 1, the file management system 100 is configured by connecting a server apparatus 101 and a plurality of client apparatuses 103 via a network 102 to be able to communicate with each other.

2. Arrangement of Server Apparatus

Figure 2:
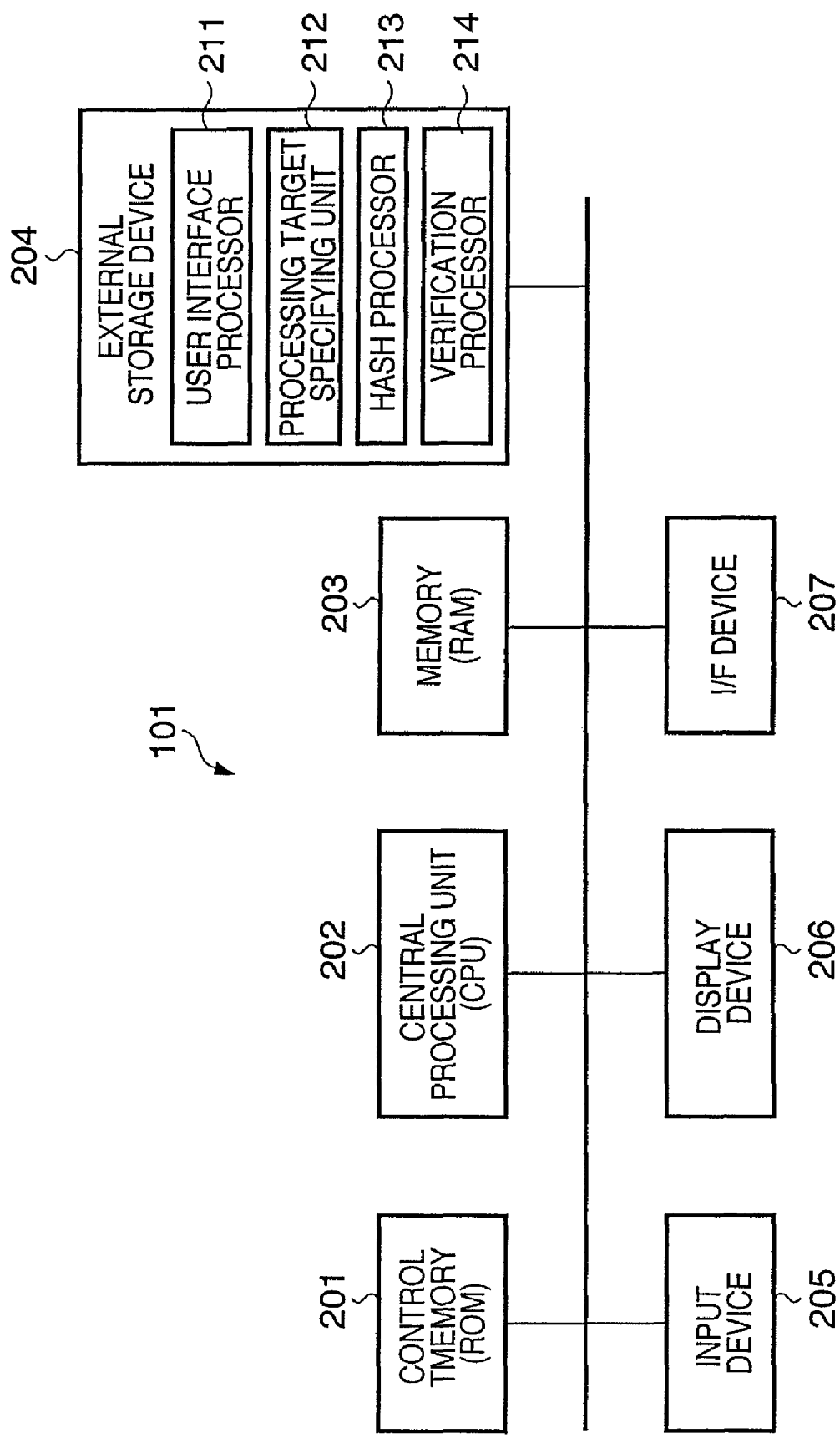
FIG. 2 is a block diagram showing the arrangement of a server apparatus 101.

FIG. 2 is a block diagram showing the arrangement of the server apparatus 101. Referring to FIG. 2, reference numeral 201 denotes a control memory (ROM); 202, a central processing unit (CPU); 203, a memory (RAM); and 204, an external storage device. Reference numeral 205 denotes an input device; 206, a display device; 207, an I/F device required to connect the network 102; and 208, a bus. The external storage device 204 stores control programs required to implement the information processing functions according to this embodiment, and data used in these control programs.

Note that the control programs required to implement the information processing functions according to this embodiment indicate, e.g., a user interface processor 211, processing target specifying unit 212, hash processor 213, verification processor 214, and the like. The data used in these control programs indicate files to be managed by the file management system 100, hash data generated by hash processing to be described later, document lists, and the like.

These control programs and data are loaded onto the RAM 203 via the bus 208 under the control of the CPU 202, and are executed by the CPU 202.

The user interface processor 211 provides, to the user, a user interface used upon application of hash processing and verification processing (to be described later) to files managed by the file management system 100. Files managed by the file management system 100 are displayed on the display device 206 via the user interface processor 211. The user inputs a target which is to undergo the hash processing or verification processing (to be described later), and the processing contents based on the display contents on the display device 206 via the input device 205. These instruction contents input via the input device 205 are recognized by the user interface processor 211.

The processing target specifying unit 212 specifies a file which is to undergo the hash processing or verification processing, based on the instruction contents recognized by the user interface processor 211.

The hash processor 213 executes hash processing for the file specified by the processing target specifying unit 212 when the instruction contents recognized by the user interface processor 211 indicate the hash processing.

The verification processor 214 executes verification processing for the file specified by the processing target specifying unit 212 when the instruction contents recognized by the user interface processor 211 indicate the verification processing.

3. User Interface

Figure 3:
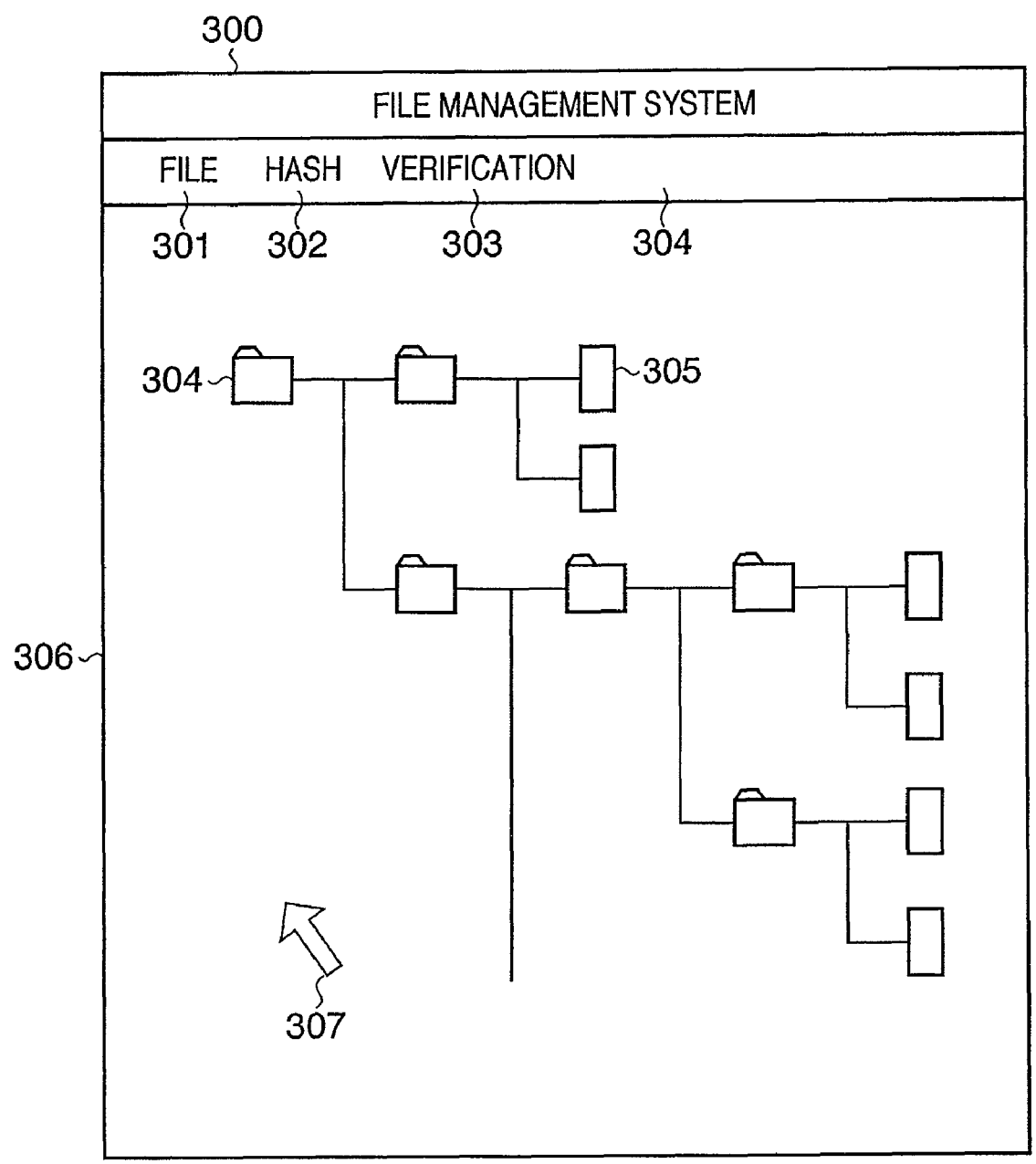
FIG. 3 shows an example of a user interface 300 provided by a user interface processor 211.

FIG. 3 shows an example of a user interface 300 provided by the user interface processor 211.

On the user interface 300, reference numeral 301 denotes a file button, which is used to make various manipulations (for example, create a new file, delete, change a name, copy, and the like) for files and folders displayed on a display area 306. Reference numeral 302 denotes a hash button. The user instructs hash processing by pressing the hash button 302. Reference numeral 303 denotes a verification button. The user instructs verification processing by pressing the verification button 303.

The display area 306 displays files managed by the file management system 100 for respective folders. In this embodiment, assume that an icon denoted by reference numeral 304 represents a folder, and an icon denoted by reference numeral 305 represents a file.

Note that the user directly selects a file or folder displayed on the display area 306 using a pointer 307 so as to designate a target which is to undergo the hash processing or verification processing.

Figure 4:
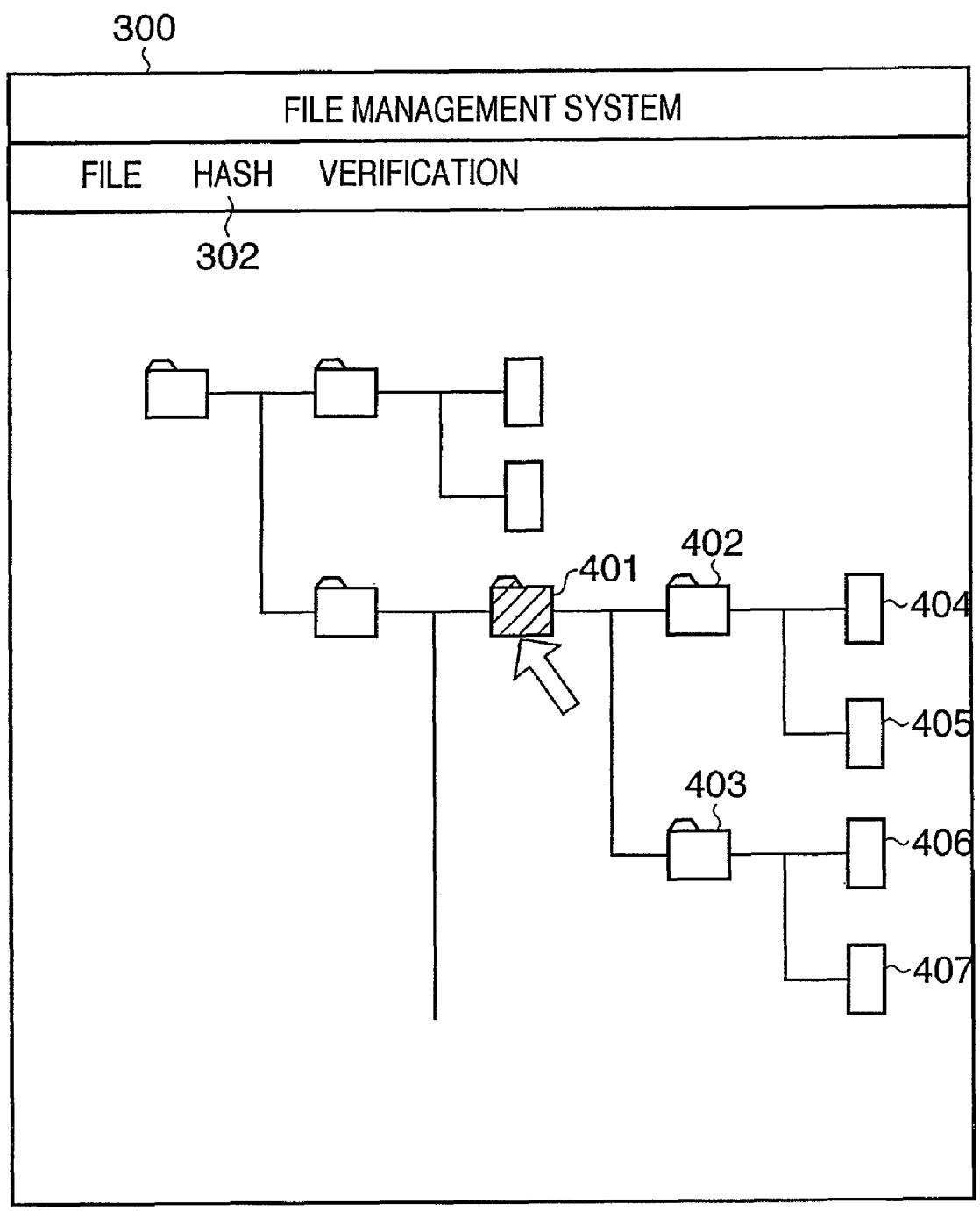
FIG. 4 shows a state in which the user selects a folder 401 on a display area 306 to designate a target to which hash processing is to be applied.

FIG. 4 shows a state in which the user selects a folder 401 on the display area 306 to designate a target which is to undergo the hash processing.

As shown in FIG. 4, the folder 401 includes two folders 402 and 403 in an immediately lower layer, and the folder 402 stores files 404 and 405. The folder 403 stores files 406 and 407. Therefore, when the user selects the folder 401 as a target which is to undergo the hash processing, the processing target specifying unit 212 specifies the files 404, 405, 406, and 407 as those which are to undergo the hash processing.

As described above, the server apparatus 101 according to this embodiment not only can designate a target which is to undergo the processing for each file but also can designate all files included in a given folder by selecting that folder.

4. Hash Processing

Figure 5:
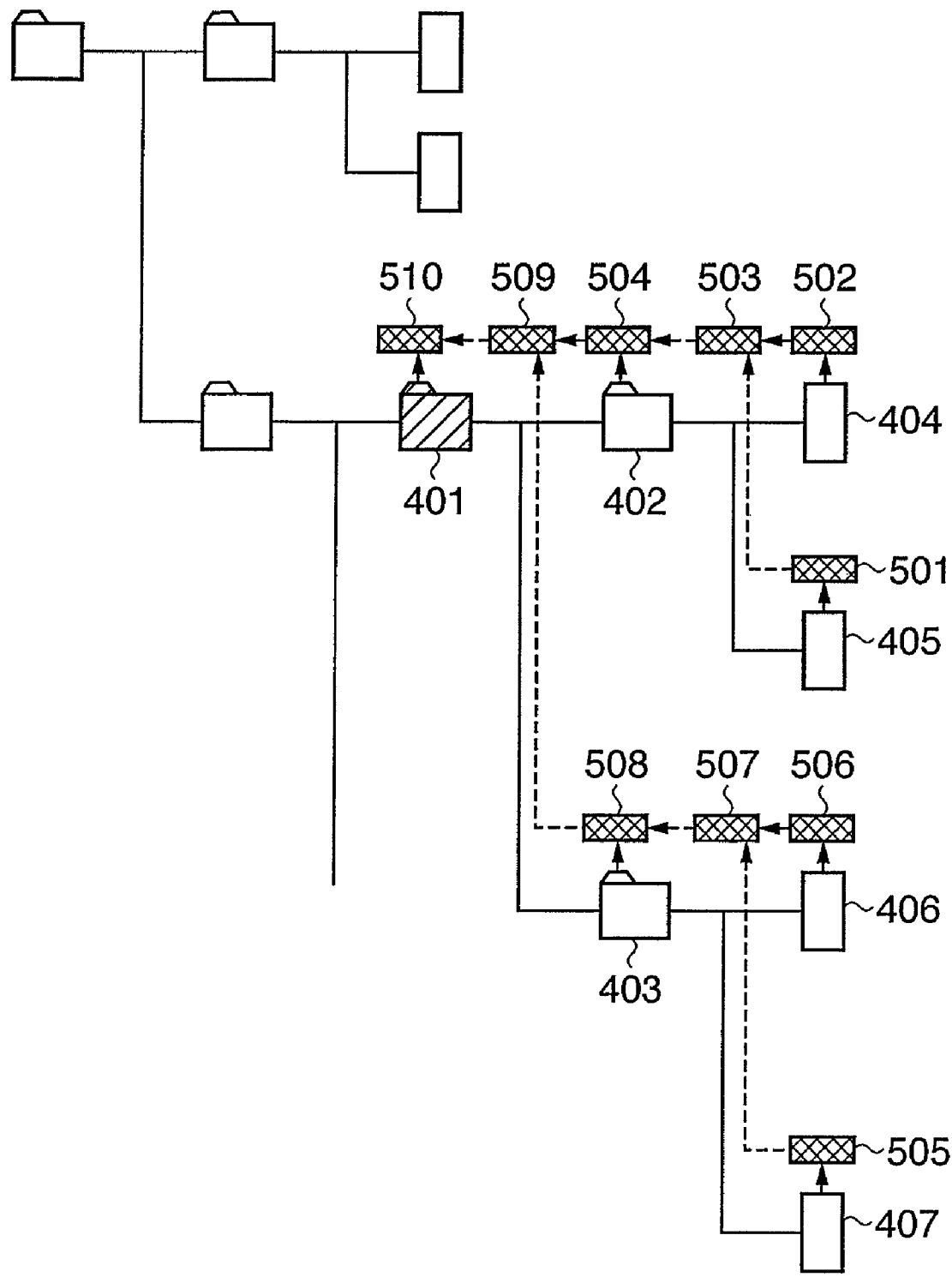
FIG. 5 is a conceptual diagram showing the sequence of the hash processing upon selection of the folder 401.
Figure 6:
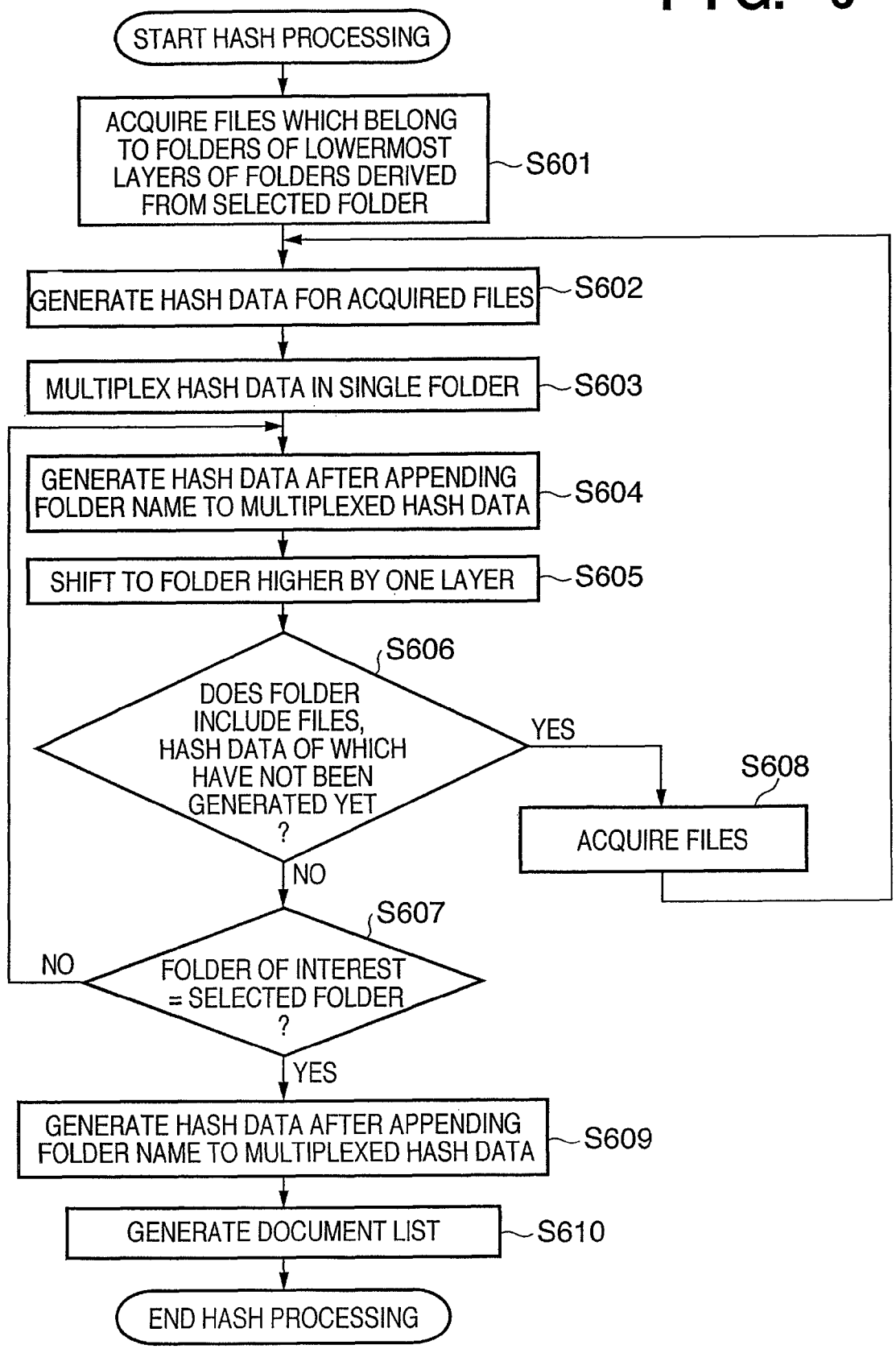
FIG. 6 is a flowchart showing the sequence of processing in a hash processor 213.

Details of the hash processing in the hash processor 213 will be described below with reference to FIGS. 5 and 6. FIG. 5 is a conceptual diagram showing the sequence of the hash processing upon selection of the folder 401. FIG. 6 is a flowchart showing the sequence of the hash processing in the hash processor 213.

In step S601, the hash processor 213 acquires a file, which is to undergo the hash processing first, of those to be processed, which are specified by the processing target specifying unit 212. More specifically, the processor 213 acquires a file included in a folder of a lowermost layer of those derived from the selected folder.

In the example of FIG. 5, the folders 402 and 403 are those which are derived from the selected folder 401, and those of the lowermost layer (a folder which does not include any more folders in its lower layer). For this reason, the files 404, 405, 406, and 407 are acquired in step S601.

In step S602, the hash processor 213 generates hash data for each of the files 404 to 407 acquired in step S601. More specifically, the processor 213 generates hash data 502 for the file 404, and hash data 501 for the file 405. Also, the processor 213 generates hash data 506 for the file 406, and hash data 505 for the file 407.

In step S603, the hash processor 213 executes processing for multiplexing the hash data in a single folder. Multiplexing the hash data is to generate hash data with a fixed length by combining the hash data. If there are three or more hash data in a single folder, these hash data are multiplexed in turn from older update orders of files.

In the example of FIG. 5, since the hash data 501 and 502 are included in the single folder 402, they are multiplexed to generate hash data 503. Likewise, since the hash data 505 and 506 are included in the single folder 403, they are multiplexed to generate hash data 507.

In step S604, the hash processor 213 appends the folder name of the folder to which the files used to generate the hash data to the multiplexed hash data, and then executes the hash processing again. In the example of FIG. 5, the processor 213 appends the folder name of the folder 402 to the hash data 503, and executes the hash processing to generate hash data 504. Likewise, the processor 213 appends the folder name of the folder 403 to the hash data 507, and then executes the hash processing to generate hash data 508.

In step S605, the hash processor 213 shifts to a folder higher by one layer. In this embodiment, the processor 213 shifts from the folders 402 and 403 as those of the lowermost layer to the folder 401 higher by one layer.

The hash processor 213 checks in step S606 if the folder after shift includes files, hash data of which have not been generated yet. If it is determined that the folder after shift includes files, hash data of which have not been generated yet, the process advances to step S608. In step S608, the processor 213 acquires those files, and the process returns to step S602. On the other hand, if it is determined that the folder after shift does not include any files, hash data of which have not been generated yet, the process advances to step S607. The processor 213 checks in step S607 if the folder after shift is the selected folder. If it is determined that the folder is not the selected folder, the process returns to step S604. On the other hand, if it is determined that the folder is the selected folder, the process advances to step S609.

In the example of FIG. 5, since the folder 401 after shift does not include any files, hash data of which have not been generated yet, the process advances to step S607. Furthermore, since the folder 401 after shift is the selected folder, the process advances to step S609.

In step S609, the hash processor 213 multiplexes the hash data in the folder, appends the folder name of that folder, and then executes the hash processing again. In the example of FIG. 5, the processor 213 multiplexes the hash data 504 and 508 in the folder 401 to generate hash data 509, appends the folder name of the folder 401 to the hash data 509, and then executes the hash processing again. In this way, hash data 510 is generated.

In step S610, the hash processor 213 generates a document list based on the processes in steps S601 to S609. The document list indicates the correspondence among the selected folder, hash data generated for the selected folder, and files included in the selected folder and their hash data.

FIG. 7 shows an example of a document list 700 generated in step S610. A column 701 stores the folder 401 as the selected folder, and a column 702 stores the hash data 510 as the multiplexed hash data obtained as a result of the hash processing for the selected folder 401.

A column 703 stores the files 404 to 407 included in the folder 401 in association with the folder 401, and a column 704 stores the hash data 501, 502, 505, and 506 of these files 404 to 407.

Upon completion of generation of the document list in step S610, the hash processor 213 ends the hash generation processing.

Note that the hash processing generates hash data for respective files, multiplexes these hash data, appends, to the multiplexed hash data, the folder name of the folder to which these files belong, and then generates hash data again. However, the present invention is not particularly limited to this. For example, hash data may be simply generated for respective files, and may be multiplexed in a predetermined order to generate multiplexed hash data.

Note that the reason why the hash data is generated by the method of this embodiment is not only to detect alterations etc. of files themselves but also to detect alterations that move files to another folder upon detection of alterations etc.

That is, when hash data are simply generated for respective files, and are merely multiplexed in a predetermined order, if an alteration that moves a specific file to another folder has been made, it cannot often be detected. This is the case when multiplexed hash data generated before movement becomes the same as that generated after movement, and the method of this embodiment can avoid such situation.

5. Verification Processing

Figure 8:
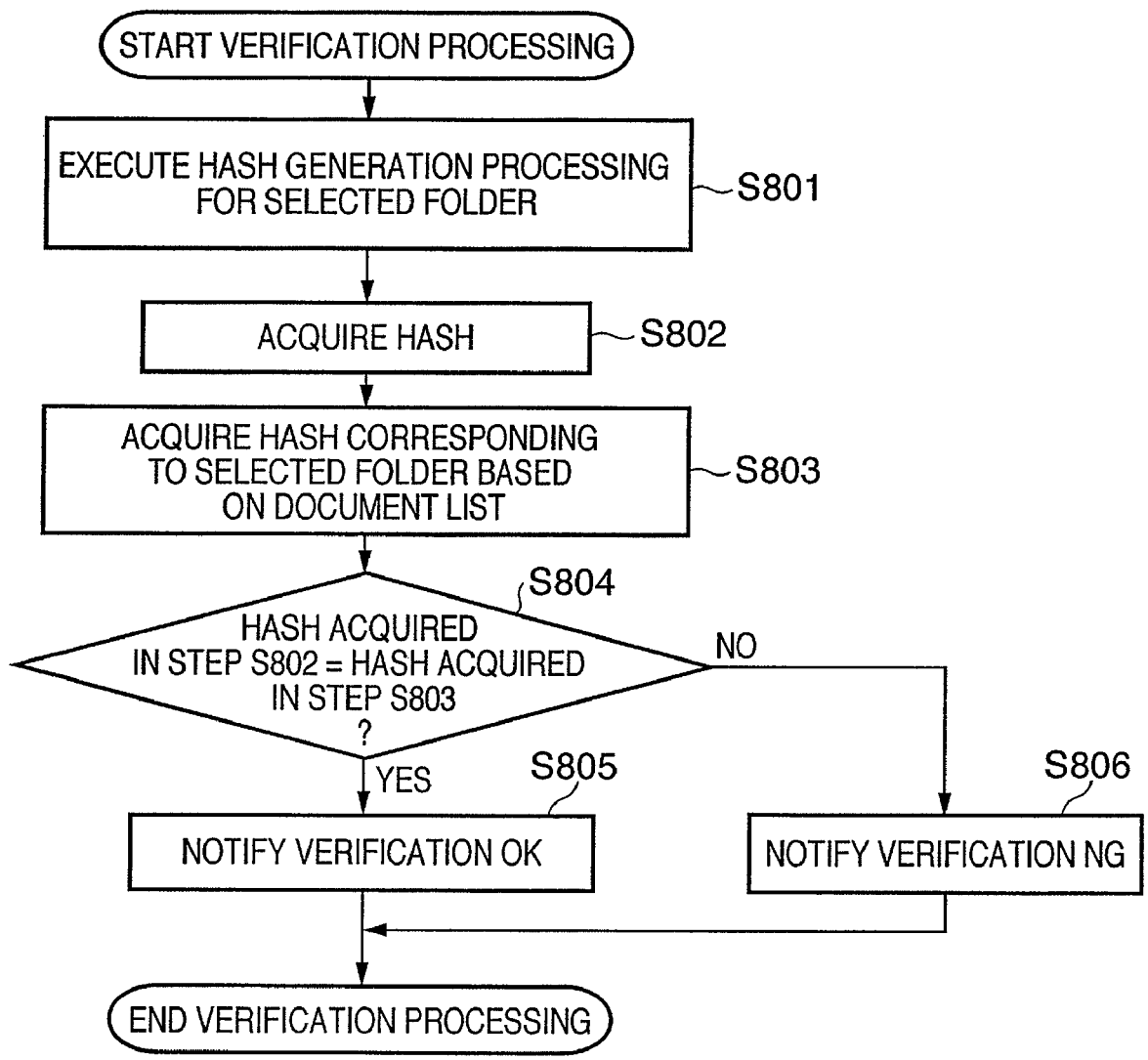
FIG. 8 is a flowchart showing the sequence of processing in a verification processor 214.

The verification processing will be described below with reference to FIG. 8. FIG. 8 is a flowchart showing the sequence of processing in the verification processor 214.

If the user presses the verification button 303 after he or she selects a predetermined folder on the user interface 300, the verification processor 214 starts verification processing.

In step S801, the verification processor 214 executes the hash generation processing (FIG. 6) for the folder selected on the user interface 300. Note that the following description will be given under the assumption that the folder 401 is selected also in this case.

In step S802, the verification processor 214 acquires hash data obtained as a result of the hash generation processing in step S801.

In step S803, the verification processor 214 acquires hash data corresponding to the selected folder based on the document list 700. In the example of FIG. 7, the processor 214 acquires the hash data 510 as that corresponding to the selected folder 401.

In step S804, the verification processor 214 compares the hash data acquired in step S802 with that acquired in step S803. As a result of comparison, if the two data are equal to each other, the process advances to step S805. If the hash data acquired in step S802 is equal to that acquired in step S803, this means that no alterations etc. have been applied to the files 404 to 407 included in the selected folder 401. Also, this means that there is no file which is moved to another folder of the files 404 to 407 included in the selected folder 401. Therefore, the processor 214 notifies "verification OK" (displays it on the user interface 300) in step S805.

On the other hand, as a result of comparison, if the two data are different from each other, the process advances to step S806. If the hash data acquired in step S802 is different from that acquired in step S803, this means that alterations etc. have been applied to any of the files 404 to 407 included in the selected folder 401. Or this means that there is a file which is moved to another folder of the files 404 to 407 included in the selected folder 401. In step S806, the verification processor 214 notifies "verification NG" (displays it on the user interface 300).

Upon completion of either notification in step S805 or S806, the verification processor 214 ends the verification processing.

As can be apparent from the above description, according to this embodiment, upon application of the processing required to detect alterations etc. to files managed by the file management system, the processing can be executed for respective folders. As a result, compared to the conventional case in which the processing is executed for respective files, the load on the user can be greatly reduced.

According to this embodiment, upon verification of the presence/absence of alterations etc. for files managed by the file management system, the processing can be executed for respective folders. As a result, compared to the conventional case in which the verification processing is executed for respective files, the load on the user can be greatly reduced.

Second Embodiment

In the first embodiment, when the user selects a predetermined folder, all files included in that folder are selected as those to be processed. However, the present invention is not particularly limited to this. Some file management systems prompt the user to input a user ID upon login, and set access rights for respective user IDs, thus limiting files that the user can access. In such system, it is not desirable to execute the aforementioned processing even for files, the access right of which the user does not have.

In consideration of such system, in this embodiment, when the user selects a predetermined folder, files, the access right of which the user has, of those included in the folder are selected as those to be processed. A server apparatus according to this embodiment will be described below. Note that the arrangement of the file management system, that of the server apparatus, and the like are the same as those in the first embodiment, and a repetitive description thereof will be avoided.

1. User Interface

Figure 9:
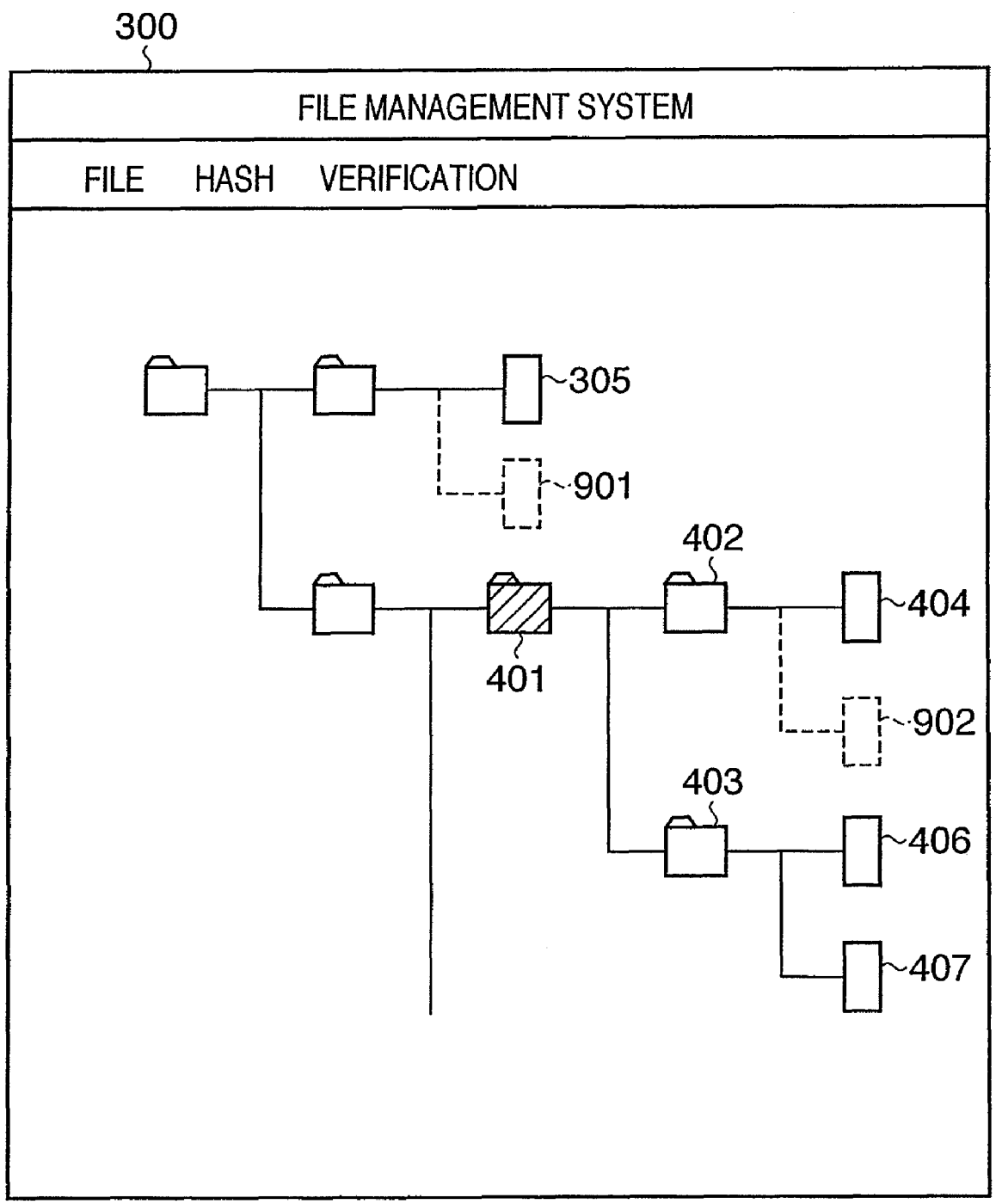
FIG. 9 shows a user interface 300 of a server apparatus according to the second embodiment of the present invention.

FIG. 9 shows a user interface 300 of the server apparatus according to this embodiment. Referring to FIG. 9, an icon 305 illustrated by the solid line indicates an accessible file. On the other hand, files indicated by icons 901 and 902 illustrated by the dotted lines are those which are managed by the file management system, but the access right of which the current login user does not have. In the example of FIG. 9, these files 901 and 902 are illustrated using the dotted lines for the sake of convenience, but they are not displayed on the actual user interface 300.

2. Hash Processing

Figure 10:
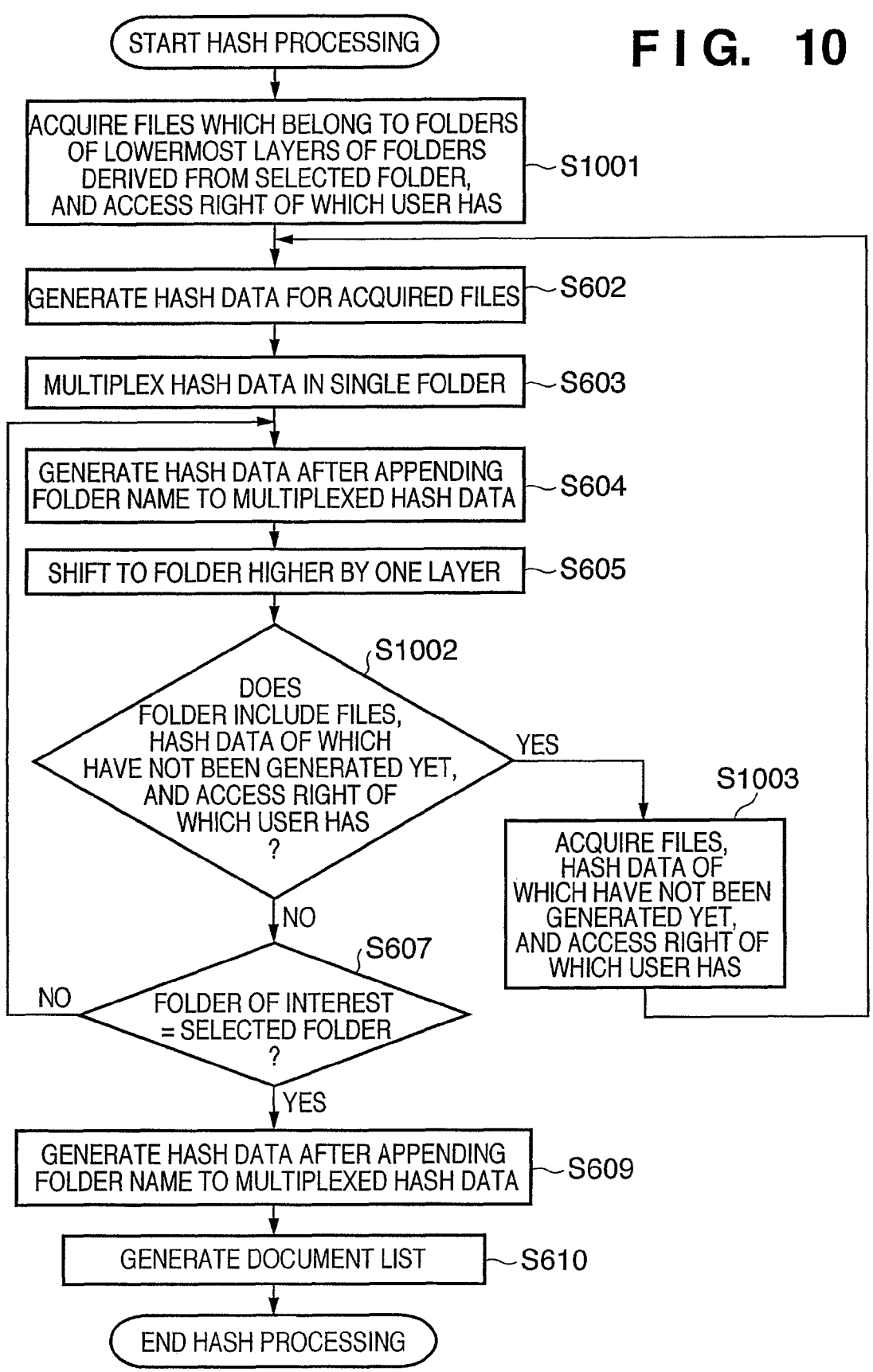
FIG. 10 is a flowchart showing the sequence of hash generation processing in the server apparatus according to the second embodiment of the present invention.

FIG. 10 is a flowchart showing the sequence of the hash processing in the server apparatus according to this embodiment. Note that the same step numbers denote the steps that execute the same processes as those in the flowchart shown in FIG. 6, and a repetitive description thereof will be avoided.

In step S1001, the hash processor 213 acquires a file, which is to undergo the hash processing first, of those to be processed, which are specified by the processing target specifying unit 212. More specifically, the processor 213 acquires a file included in a folder of a lowermost layer of those derived from the selected folder, and the file, the access right of which the user has.

In the example of FIG. 9, folders 402 and 403 are those which are derived from the selected folder 401, and those of the lowermost layer. Also, the folders 402 and 403 include files 404, 902, 406, and 407. However, of these files, since the current login user does not have any access right to the file 902, the files 404, 406, and 407 are acquired in step S1001.

Since steps S602 to S605 are the same as the processes in steps S602 to S605 in FIG. 5, a repetitive description thereof will be avoided.

The hash processor 213 checks in step S1002 if the folder after shift includes files, hash data of which have not been generated yet, and the access right of which the current login user has. If it is determined that the folder after shift does not include any files, hash data of which have not been generated yet, and the access right of which the current login user does not have, the process advances to step S607. On the other hand, if it is determined that the folder after shift includes files, hash data of which have not been generated yet, and the access right of which the current login user has, the process advances to step S1003. In step S1003, the processor 213 acquires these files, and the process returns to step S602.

Since steps S607, S609, and S610 are the same as the processes in steps S607, S609, and S610, a repetitive description thereof will be avoided.

As can be seen from the above description, according to this embodiment, the processing of files managed by the file management system can be executed for respective folders, and can also be selectively executed in accordance with the presence/absence of the access right of the user.

As a result, a situation in which the processing is executed even for files, the access right of which the user does not have can be avoided.

Upon execution of verification as well, the processing can be executed for respective folders to cover only files, the access right of which the user has. With this configuration, even when a file which is included in the folder and is not related to that user (a file that the user has no interest in) is updated, alteration of that file can be prevented from being notified. In other words, verification can be executed only for files, the access right of which the user has (files that the user is interested in), upon execution of verification for respective folders.

Third Embodiment

In the first and second embodiments, alterations etc. of files are detected based on whether or not the hash data of files are equal to each other. However, the present invention is not particularly limited to this.

For example, signature information created using a private key issued by a certificate authority may be appended to a file, and its hash data may then be generated.

Other Embodiments

Note that the present invention may be applied to either a system constituted by a plurality of devices (e.g., a host computer, interface device, reader, printer, and the like), or an apparatus consisting of a single device (e.g., a copying machine, facsimile apparatus, or the like).

The objects of the present invention are also achieved by supplying a computer-readable storage medium, which records a program code of software that implements the functions of the aforementioned embodiments to the system or apparatus. In this case, the functions are implemented when a computer (or a CPU or MPU) of the system or apparatus reads out and executes the program code stored in the storage medium. Note that the storage medium that stores the program code constitutes the present invention in such case.

As the storage medium for supplying the program code, for example, a Floppy® disk, hard disk, optical disk, magneto-optical disk, CD-ROM, CD-R, magnetic tape, nonvolatile memory card, ROM, and the like may be used.

The present invention is not limited to the case in which the functions of the aforementioned embodiments are implemented when the computer executes the readout program code. For example, the present invention also includes a case wherein an OS (operating system) running on a computer may execute some or all of actual processes based on an instruction of the program code to implement the functions of the aforementioned embodiments.

Furthermore, the present invention also includes a case wherein the functions of the aforementioned embodiments are implemented after the program code read out from the storage medium is written in a function expansion board or unit, which is inserted in or connected to the computer. That is, the present invention includes a case wherein after the program code is written in a memory, a CPU or the like equipped on the function expansion board or unit executes some or all of actual processes to implement the functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-336372 filed on Dec. 13, 2006, which is hereby incorporated by reference herein in its entirety.

What is claimed is:

1. An information processing apparatus comprising:
  a control unit configured to display a plurality of folders and a plurality of files on a display device;
  a designation unit configured to designate a folder from the plurality of displayed folders based on a user's selection;
  a first generation unit configured to generate hash data for the folder designated by the designation unit, hash data for each of folders which are derived from the folder designated by the designation unit, hash data for each of files included in the folder designated by the designation unit, and hash data for each of files included in each of folders which are derived from the folder designated by the designation unit;

a second generation unit configured to generate one multiplexed hash data with a fixed length by repeating a multiplexing process for the hash data generated for each of the folders and each of the files, from a folder of a lowermost layer to the designated folder in turn, wherein the folder of the lowermost layer is derived from the designated folder; and a storage medium configured to store the one multiplexed hash data with a fixed length generated by the second generation unit in association with the folder designated by the designation unit, wherein if a folder includes a plurality of files, then the second generation unit repeats the multiplexing process for the hash data for each of the plurality of files according to update time orders of the plurality of files included in the folder.

2. The apparatus according to claim 1, further comprising a verification unit configured to verify the presence/absence of alterations of files included in the folder designated by the designation unit, wherein the verification unit verifies the presence/absence of alterations by comparing one multiplexed hash data with a fixed length generated by operating the first generation unit and the second generation unit based on a user's selection, and the one multiplexed hash data with a fixed length which has already been stored in the storage medium in association with the folder designated by the designation unit.

3. The apparatus according to claim 1, wherein the first generation unit generates the hash data for files for which the user who selected the folder has access rights, from among the files included in the folder designated by the designation unit and included in each of folders which are derived from the folder designated by the designation unit.

4. An information processing method executed by using a microprocessor, comprising:

a controlling step of displaying a plurality of folders and a plurality of files on a display device;

a designating step of designating a folder from the plurality of displayed folders based on a user's selection;

a first generation step of generating hash data for the folder designated in the designation step, hash data for each of folders which are derived from the folder designated in the designation step, hash data for each of files included in the folder designated in the designating step, and hash data for each of files included in each of folders which are derived from the folder designated in the designation step;

a second generation step of generating one multiplexed hash data with a fixed length by repeating a multiplexing process for hash data generated for each of the folders and each of the files, from a folder of a lowermost layer to the designated folder in turn, wherein the folder of the lowermost layer is derived from the designated folder; and a storage step of storing the one multiplexed hash data with a fixed length generated in the second generation step in association with the designated folder, wherein if a folder includes a plurality of files, then the second generation step repeats the multiplexing process for the hash data for each of the plurality of files according to update time orders of the plurality of files included in the folder.

5. A computer-readable storage medium retrievably storing a computer program, wherein the program instructs a microprocessor to perform the following steps:

a controlling step of displaying a plurality of folders and a plurality of files on a display device;

a designating step of designating a folder from the plurality of displayed folders based on a user's selection;

a first generation step of generating hash data for the folder designated in the designation step, hash data for each of folders which are derived from the folder designated in the designation step, hash data for each of files included in the folder designated in the designating step, and hash data for each of files included in each of folders which are derived from the folder designated in the designating step;

a second generation step of generating one multiplexed hash data with a fixed length by repeating a multiplexing process for the hash data generated for each of the folders and each of the files, from a folder of a lowermost layer to the designated folder in turn, wherein the folder of the lowermost layer is derived from the designated folder; and a storage step of storing the one multiplexed hash data with a fixed length generated in the second generation step in association with the designated folder, wherein if a folder includes a plurality of files, then the second generation step repeats the multiplexing process for the hash data for each of the plurality of files according to update time orders of the plurality of files included in the folder.

* * * * *